United States Patent
Musha et al.

(10) Patent No.: US 8,417,932 B2
(45) Date of Patent: Apr. 9, 2013

(54) INFORMATION PROCESSING APPARATUS AND CONTROL METHOD THEREOF

(75) Inventors: Yuichi Musha, Kawasaki (JP); Jinsuke Nakai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 139 days.

(21) Appl. No.: 13/048,232

(22) Filed: Mar. 15, 2011

(65) Prior Publication Data

US 2011/0167251 A1 Jul. 7, 2011

Related U.S. Application Data (63) Continuation of application No. PCT/JP2008/066784, filed on Sep. 17, 2008.

(51) Int. Cl.
| | |
|---|---|
| G06F 15/177 | (2006.01) |
| G06F 9/00 | (2006.01) |
| G06F 13/00 | (2006.01) |
| G06F 12/00 | (2006.01) |
| G06F 11/00 | (2006.01) |

(52) U.S. Cl.
USPC .................. 713/2; 713/1; 709/220; 710/104; 711/100; 714/36

(58) Field of Classification Search .................. 713/1, 2; 709/220; 710/104; 711/100; 714/36
See application file for complete search history.

(56) References Cited

U.S. PATENT DOCUMENTS

| | | | |
|---|---|---|---|
| 7,181,609 B2 * | 2/2007 | Connor et al. | 713/2 |
| 7,987,336 B2 * | 7/2011 | Kirscht et al. | 711/173 |
| 2005/0289332 A1 * | 12/2005 | Rothman et al. | 713/1 |
| 2006/0212550 A1 | 9/2006 | Oda | |

FOREIGN PATENT DOCUMENTS

| | | |
|---|---|---|
| JP | 62-28841 | 2/1987 |
| JP | 62-226216 | 10/1987 |
| JP | 9-198325 | 7/1997 |
| JP | 2003-84981 | 3/2003 |
| JP | 2006-259903 | 9/2006 |

OTHER PUBLICATIONS

International Search Report, mailed Jan. 6, 2009, in corresponding International Application No. PCT/JP2008/066784 (1 pg).

* cited by examiner

*Primary Examiner* — Stefan Stoynov
(74) *Attorney, Agent, or Firm* — Staas & Halsey LLP (57) ABSTRACT

An information processing apparatus including an apparatus body and a system control apparatus. The apparatus body includes a first processing unit that executes an arithmetic operation; a first storage unit that stores configuration information of the first processing unit; and a first control unit that controls a readout of the configuration information. The system control apparatus includes a second storage unit that stores a program for controlling the system control apparatus and diagnosis procedures of the information processing apparatus; a second processing unit that reads the program and executes the program; and a second control unit that detects the first processing unit by reading the configuration information via the first control unit on the basis of the diagnosis procedures stored in the second storage unit simultaneously with the execution of the program by the second processing unit.

6 Claims, 11 Drawing Sheets

| ORDER | DEVICE TYPE | DEVICE NUMBER | ACCESS TARGET DEVICE | ACCESS TYPE | ACCESS ADDRESS | RESULT STORAGE ADDRESS | DATA SIZE | MEANINGS |
|---|---|---|---|---|---|---|---|---|
| 1 | CPU | 0x00 | ROM | I2C | 0x1234 | 0x1020 | 0x4 | ACQUISITION OF HARDWARE INFORMATION OF CPU BOARD #0 |
| 2 | CPU | 0x01 | ROM | I2C | 0x1234 | 0x1030 | 0x4 | ACQUISITION OF HARDWARE INFORMATION OF CPU BOARD #1 |
| 3 | CPU | 0x00 | CPU #0 | JTAG | 0xabcd | 0x1040 | 0x2 | ACQUISITION OF HARDWARE INFORMATION OF CPU BOARD #0/CPU #0 |
| 4 | CPU | 0x01 | CPU #1 | JTAG | 0xabcd | 0x1050 | 0x2 | ACQUISITION OF HARDWARE INFORMATION OF CPU BOARD #1/CPU #1 |
| 5 | IOU | 0x00 | ROM | I2C | 0x5678 | 0x1060 | 0x4 | ACQUISITION OF HARDWARE INFORMATION OF IOU BOARD #0 |
| 6 | PSU | 0x00 | ROM | I2C | 0x5678 | 0x1070 | 0x2 | ACQUISITION OF HARDWARE INFORMATION OF PSU #0 |

FIG. 10

| ADDRESS | STATUS (0x00= MOUNTED) (0x01= NOT MOUNTED) (0xff= FAILURE) | DEVICE INFORMATION | MEANINGS |
|---|---|---|---|
| 0x1020 | 0x00 | 0x00808022 | HARDWARE INFORMATION OF CPU BOARD #0 |
| 0x1030 | 0xff | 0x00000000 | FAILURE IN ACQUISITION |
| 0x1040 | 0x00 | 0x0080 | HARDWARE INFORMATION OF CPU BOARD #0/CPU #0 |
| 0x1050 | 0x01 | 0x0000 | UNABLE TO ACQUIRE DUE TO NOT MOUNTED |
| 0x1060 | 0x00 | 0x00808055 | HARDWARE INFORMATION OF IOU #0 |
| 0x1070 | 0x00 | 0x0080 | HARDWARE INFORMATION OF PSU #0 |

INFORMATION PROCESSING APPARATUS AND CONTROL METHOD THEREOF

CROSS-REFERENCE TO RELATED APPLICATIONS

This is a continuation of Application PCT/JP2008/066784, filed on Sep. 17, 2008, the entire contents of which are herein wholly incorporated by reference.

FIELD

The present invention relates to an information processing apparatus to reduce a startup process and to a control method thereof.

BACKGROUND

Over the recent years, developments of information technologies have involved scaling up a system configuration and advancing multifunction such as increasing a CPU (Central Processing Unit) count, a memory capacity or an I/O (Input/Output) device count in an information processing apparatus. The advancements of the scale-up and the multifunction, however, lead to a tendency of increasing initial diagnosis steps in the startup of the information processing apparatus and elongating a period of time from the time when the startup is started to the time when the device reaches a usable status, i.e., a startup time.

Therefore a variety of techniques for reducing the startup time of the information processing apparatus are proposed.

Provided are, e.g., a startup mode in which device detection for detecting the devices such as CPUs (Central Processing Unit), memories and I/O (Input/Output) devices is performed and a startup mode in which the device detection is omitted using past detected results stored in a nonvolatile memory, in which the mode is selected based on a period of time of pressing a power source switch. With this mode selection, if the device detection is unnecessary, the startup time is reduced by omitting the detection.

Further, such an apparatus is proposed that stores connection status of devices in the nonvolatile memory at the startup immediately after configuration change, and reduces the startup time by making the use of contents in the nonvolatile memory at the subsequent startup.

Patent document 1: Japanese Laid-Open Patent Publication No. 2006-259903

Patent document 2: Japanese Laid-Open Patent Publication No. 2003-84981

In the case of reducing the startup time by selecting the omission of the device detection, such a problem exists that inconvenience arises if there is a discrepancy between the past detected result and the device configuration.

Further, in the case of storing the connection status of the devices when the configuration is changed, the devices must be again detected at the startup after changing the configuration, therefore this is not a fundamental solution.

SUMMARY

According to an aspect of the invention, an information processing apparatus includes an information processing apparatus body; and a system control apparatus to diagnose the information processing apparatus body. The information processing apparatus body includes a first processing unit to execute an arithmetic operation; a first storage unit to store configuration information of the first processing unit; and a first control unit to control a readout of the configuration information from the first storage unit. The system control apparatus includes a second storage unit to store a program for controlling the system control apparatus and diagnosis procedures of the information processing apparatus; a second processing unit to read the program from the second storage unit and execute the program; and a second control unit to detect the first processing unit by reading, in parallel with the execution of the program by the second processing unit, the configuration information of the first processing unit from the first storage unit via the first control unit on the basis of the diagnosis procedures stored in the second storage unit.

According to another aspect of the invention, an information processing apparatus includes an information processing apparatus body having functional units; and a system control apparatus to diagnose the information processing apparatus body. Each of the functional units of the information processing apparatus body includes a first processing unit to execute a specific operation; a first storage unit to store configuration information of the first processing unit; and a first control unit to control a readout of the configuration information from the first storage unit. The system control apparatus includes a second storage unit to store a program for controlling the system control apparatus and diagnosis procedures of the information processing apparatus; a second processing unit to read the program from the second storage unit and execute the program; and a second control unit to detect the first processing unit of each of the functional units by reading, in parallel with the execution of the program by the second processing unit, the configuration information from the first storage unit via the first control unit of each of the functional units on the basis of the diagnosis procedures stored in the second storage unit.

According to still another aspect of the invention, a information processing apparatus control method of controlling an information processing apparatus, which includes an information processing apparatus body including a first processing unit to execute an arithmetic operation, a first storage unit to store configuration information of the first processing unit, and a first control unit to control a readout of the configuration information from the first storage unit; and a system control apparatus to diagnose the information processing apparatus body, includes getting a second processing unit of the system control apparatus read a program for controlling the system control apparatus and diagnosis procedures of the information processing apparatus from a second storage unit of the system control apparatus and to execute the program; and getting the second control unit to detect the first processing unit by reading, in parallel with the execution of the program by the second processing unit, the configuration information of the first processing unit from the first storage unit via the first control unit on the basis of the diagnosis procedures stored in the second storage unit.

According to yet another aspect of the invention, a information processing apparatus control method of controlling an information processing apparatus, which includes an information processing apparatus body having functional units, each including a first processing unit to execute a specific operation, a first storage unit to store configuration information of the first processing unit, and a first control unit to control a readout of the configuration information from the first storage unit; and a system control apparatus to diagnose the information processing apparatus body, includes getting a second processing unit of the system control apparatus read a program for controlling the system control apparatus and diagnosis procedures of the information processing apparatus from a second storage unit stored and to execute the program;

and getting the second control unit to detect the first processing unit of each of the functional units by reading, in parallel with the execution of the program by the second processing unit, the configuration information from the first storage unit via the first control unit of each of the functional units on the basis of the diagnosis procedures stored in the second storage unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Preferred embodiment of the present invention will hereinafter be described with reference to the drawings. A configuration in the following embodiment is an exemplification, and the present invention is not limited to the configuration in the embodiment.

Figure 1:
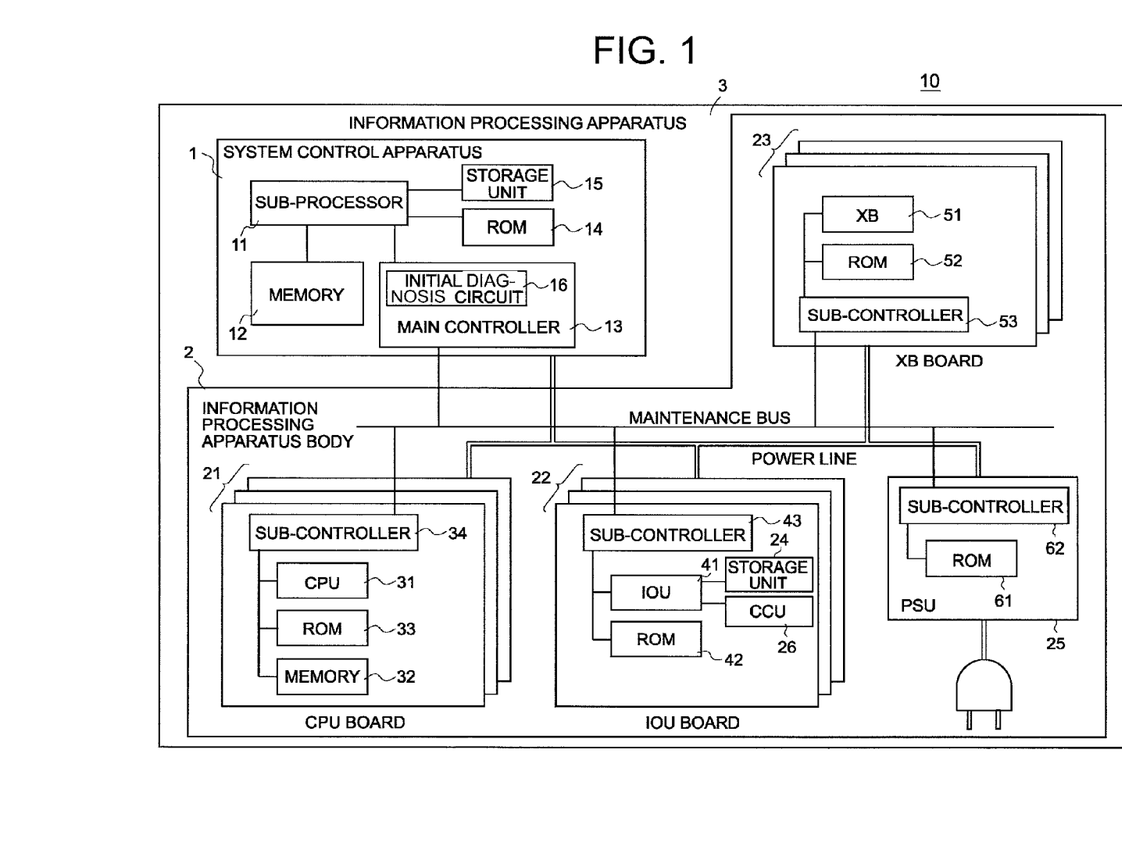
FIG. 1 is a schematic diagram of an information processing apparatus in an embodiment.

FIG. 1 is a schematic diagram of an information processing apparatus according to one example of the embodiment.

The information processing apparatus 10 according to this embodiment includes a system control apparatus 1 and an information processing apparatus body 2 in a housing 3.

The system control apparatus (a service processor) 1 is an independent computer which performs an initial diagnosis and operation management of the information processing apparatus body 2. The system control apparatus 1 includes a processor (sub-processor) 11, a memory 12, a main controller 13, a ROM (Read Only Memory) 14 and a storage unit 15.

The storage unit 15 is a storage device, such as a flash memory, stored with an OS (Operating System), a program for the operation management and the like. Note that the storage unit 15 may take a configuration serving also as the memory 12.

The processor 11 executes processes such as the operation management of the information processing apparatus body 2 by reading the operation management program from the storage unit 15 into the memory 12 and properly executing the program. Note that the processor 11, when being powered on, at first reads a boot loader from the storage unit 15, reads the OS for the system controller from the storage unit 15 by executing the boot loader, and thereafter reads the operation management program from the storage unit 15.

The main controller 13 is connected to the respective units of the information processing apparatus body 2 and to a sub-controller (which will be described later on) via a maintenance bus such as I2C (Inter-Integrated Circuit) bus or a JTAG (Joint Test Action Group) bus, and thus controls communications for collecting and diagnosing items of information on other respective units of the information processing apparatus body 2.

Figure 2:
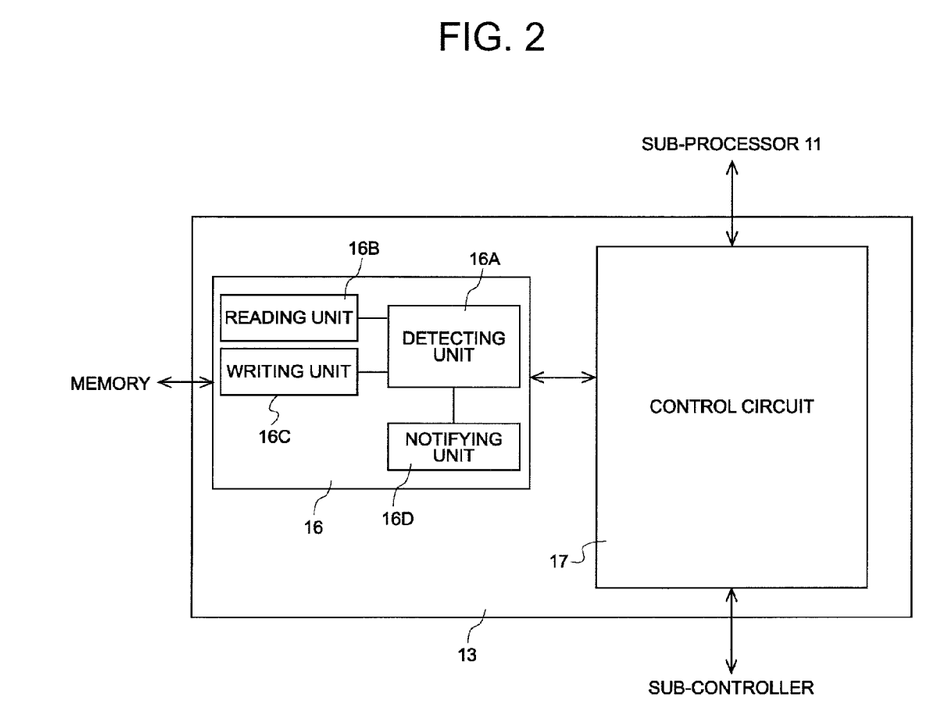
FIG. 2 is a schematic diagram of a main controller in the embodiment.

FIG. 2 is a schematic diagram of the main controller 13. As illustrated in FIG. 2, the main controller 13 includes an initial diagnosis circuit 16 which performs the initial diagnosis of hardware and a control circuit 17 which controls communications with the processor 11 and the sub-controller. The initial diagnosis circuit 16 includes a detecting unit 16A, a reading unit 16B, a writing unit 16C and a notifying unit 16D.

The detecting unit 16A accesses, based on predetermined diagnosis procedures, a plurality of devices connected via the maintenance bus, and thus detects the information of each device. Note that the detecting unit 16A, when receiving the diagnosis procedures from the memory 12 via the reading unit 16B, while the processor 11 reads the initial programs such as the boot loader and the OS, detects the items of information on the devices concurrently with the processes of the processor 11.

The reading unit 16B reads the diagnosis procedures from the memory 12 and transfers the diagnosis procedures to the detecting unit 16A.

The writing unit 16C writes the information detected by the detecting unit 16A to the memory 12.

The notifying unit 16D notifies the processor 11 batchwise of the detected results of the plurality of devices. The notifying unit 16D may notify the processor of the information itself detected by the detecting unit 16A by way of the detected result, although the notifying unit 16D in the embodiment notifies, when the detecting unit 16A completes the detection of the information, the processor 11 of the information purporting that the detection is completed by way of the detected result.

The main controller 13, as illustrated in FIG. 2, has a configuration of adding the initial diagnosis circuit 16 to the control circuit 17 that is a main component of the main controller. The main controller 13 in the embodiment is of the circuit-reconfigurable FPGA (Field Programmable Gate Array) and is therefore easy to have the configuration including the addition of the initial diagnosis circuit 16.

The information processing apparatus body 2 includes a CPU board 21, an IOU (Input Output Unit) board 22, an XBU (Crossbar Unit) board 23, a storage unit 24 and a PSU (Power Supply Unit) 25. Note that the housing 3 houses interfaces, i.e., so-called slots mounted with the CPU boards 21, the IOU boards 22 and the XBU boards 23 on a plurality-by-plurality basis. Accordingly, a user can mount an arbitrary number of one or more CPU boards 21, IOU boards 22 and XBU boards 23 within a range of a slot count (maximum mount count).

The IOU board 22 has an IOU (Input Output Unit) 41, a ROM 42, a sub-controller 43 and the like.

The IOU 41, to which peripheral devices such as the storage unit 24 like a HDD (Hard Disk Drive) and a NIC (Network Interface Card) communication control unit 26 are connected, controls inputting and outputting the data from and to the peripheral devices.

The ROM 42 is stored with performance information indicating specifications of the IOU board 22 and identifying information thereof.

The sub-controller 43 is connected to the main controller 13 of the system control apparatus 1 via the maintenance bus and, when receiving an information request from the main controller 13, collects the information of the IOU board 22 and transmits the information to the main controller 13. For example, the sub-controller 43 reads the information of the devices connected to the IOU 41 and the information stored in the ROM 42 and transmits the information.

The CPU board 21 includes a CPU 31, a memory 32, a ROM 33, a sub-controller 34, etc.

The CPU 31 reads the OS and an application program from the storage unit 24 into the memory 12 and properly executes the OS and the application program, thereby realizing a function of the application program.

The ROM 33 is stored with the performance information indicating specifications of the CPU board 21 and identifying information thereof.

The sub-controller 34 is connected to the main controller 13 of the system control apparatus 1 via the maintenance bus and, when receiving the information request from the main controller 13, collects the information of the CPU board 21 and transmits the information to the main controller 13. For example, the sub-controller 34 reads the information stored in the ROM 42 and transmits the information.

The XBU (Crossbar Unit) board 23 includes a XB (Crossbar switch) 51, a ROM 52, a sub-controller 53, etc.

The XB 51 establishes connections and transfers the data between the two of the CPUs 31 and between each of the CPUs 31 and each of the IOU boards 14. In the case of configuring an SMP system (Symmetric Multi Processing System), the XBU board 23 establishes the connections so that all of the CPUs 20 can similarly access all of the memories 30 and the I/O devices irrespective of mount positions thereof.

The ROM 52 is stored with the performance information indicating specifications of the XBU board 23 and the identifying information thereof.

The sub-controller 53 is connected to the main controller 13 of the system control apparatus 1 via the maintenance bus and, when receiving the information request from the main controller 13, collects the information of the XBU board 23 and transmits the information to the main controller 13. For example, the sub-controller 53 reads the information stored in the ROM 52 and transmits the information.

A power supply unit 25 converts an AC current supplied from a commercial power source into a predetermined DC current and thus supplies the DC current to the system control apparatus 1 and the respective units 21-23 of the information processing apparatus body 2 via a power line.

The startup of the information processing apparatus 10 is classified into a startup of the system control apparatus 1 and a startup of the information processing apparatus body 2. The startup of the information processing apparatus body is performed after the startup of the system control apparatus 1 is completed.

In the information processing apparatus 10 in the embodiment, the initial diagnosis circuit 16 performs the initial diagnosis of the connected device in parallel with a process that the processor 11 reads the initial program when the system control apparatus 1 is started, thereby reducing the startup time. This startup method capable of reducing the startup time will hereinafter be described in comparison with a comparative example.

Figure 3:
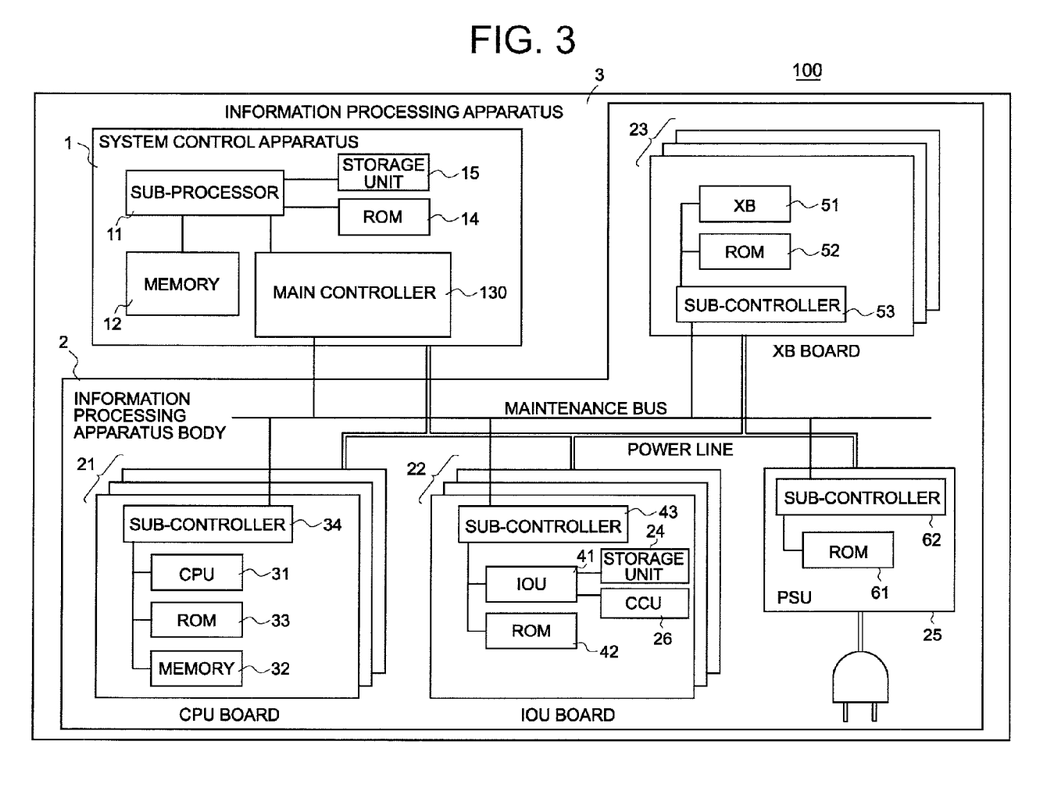
FIG. 3 is a schematic diagram of the information processing apparatus given by way of a comparative example.

FIG. 3 is a schematic diagram of an information processing apparatus 100 in a comparative example. The information processing apparatus 100 is different from the information processing apparatus 10 according to the embodiment in terms of such a point that a main controller 130 does not include the initial diagnosis circuit 16, and the processor 11 sequentially reads the initial program and performs the initial diagnosis, and other configurations are the same. Note that the same components are marked with the same numerals and symbols, and the repetitive explanations are omitted.

Figure 4:
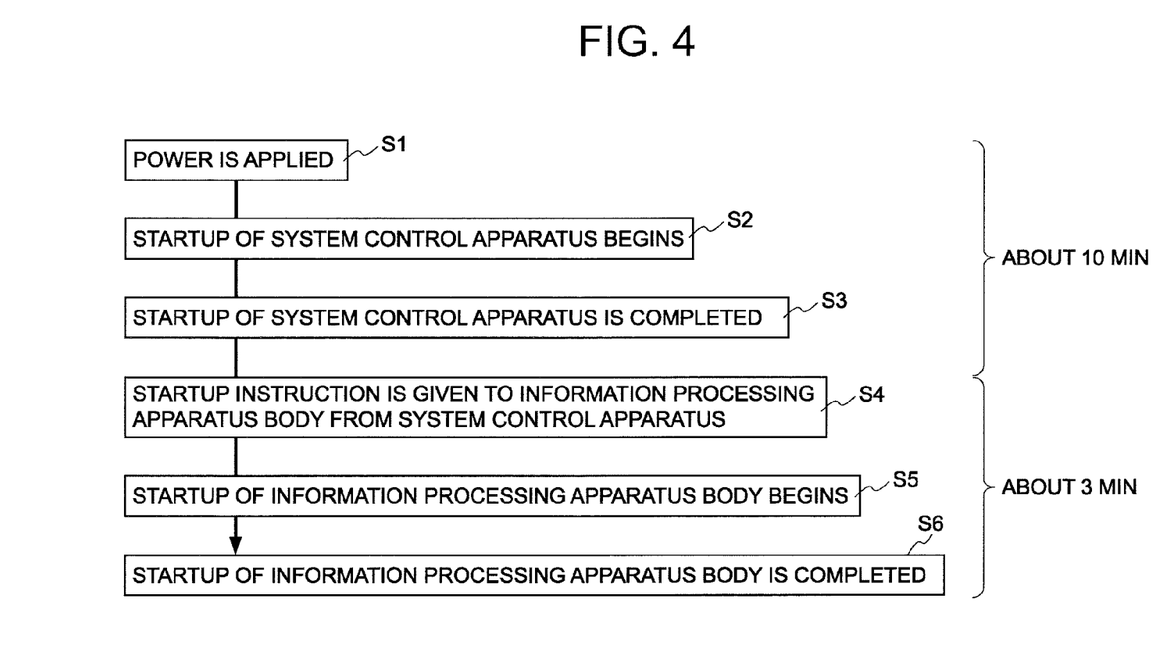
FIG. 4 is a diagram illustrating a startup flow of the comparative example.

FIG. 4 is a flowchart of the startup of the information processing apparatus 100 in the comparative example.

In the information processing apparatus 100 in the comparative example, when power is supplied as a result of operation to the power supply unit 25 (S1), first of all, the startup of the system control apparatus 1 begins (S2). Upon completing the startup of the system control apparatus 1 (S3), the system control apparatus 1 gives a startup instruction to the information processing apparatus body 2 (S4).

The information processing apparatus body 2 receiving the startup instruction initiates startup (S5), reads and executes the OS and the predetermined application software, thereby reaches in a user-usable status, or completes the startup (S6).

In this information processing apparatus 100, about 10 min is expended for the startup of the system control apparatus 1, and about 3 min is expended for the startup of the information processing apparatus body 2.

Figure 5:
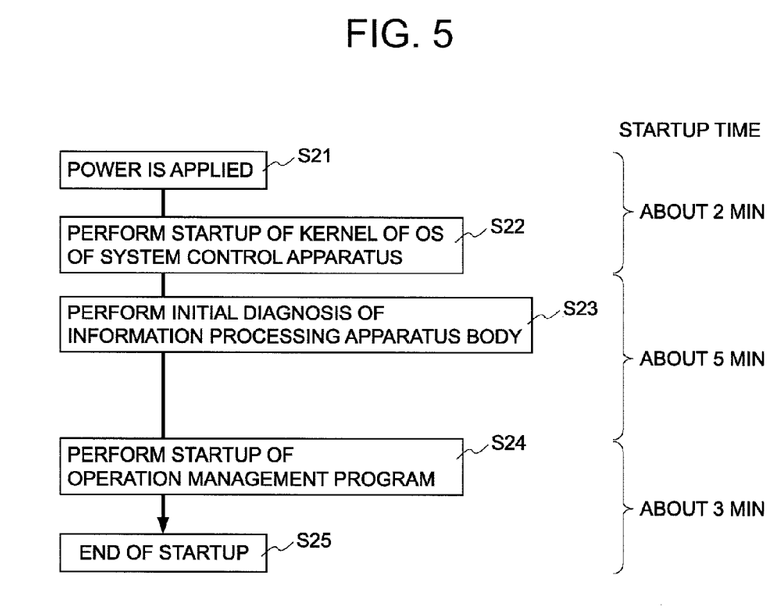
FIG. 5 is a diagram illustrating a startup flow of a system control apparatus in the comparative example.

FIG. 5 is a flowchart of the startup process of the system control apparatus 1.

In the system control apparatus 1, when power is supplied as a result of operation to the power supply unit 25 (S21), the processor 11 reads the OS and performs a startup of a kernel which controls the devices (S22). After the startup of the kernel, the processor 11 performs the initial diagnosis of the information processing apparatus body 2 under the control of the kernel (S23). Subsequently, the processor 11 reads and executes an operation management program (S24) and terminates the startup process by setting the operation management function in an operable status (S25).

The initial diagnosis of the information processing apparatus body 2 is defined as a function of acquiring the information such as the performance information and the hardware identifying information (serial number) each stored in the hardware ROM etc. The operation management function supports high-load functions such as a remote control function, a GUI (Graphical User Interface) function and a security function.

In the system control apparatus 1 of the information processing apparatus 100, after connecting with the power source, about 2 min is expended for the startup of the kernel of the OS, about 5 min is expended for the initial diagnosis of the information processing apparatus body 2, and about 3 min is expended for the startup of the operation management service.

Figure 6:
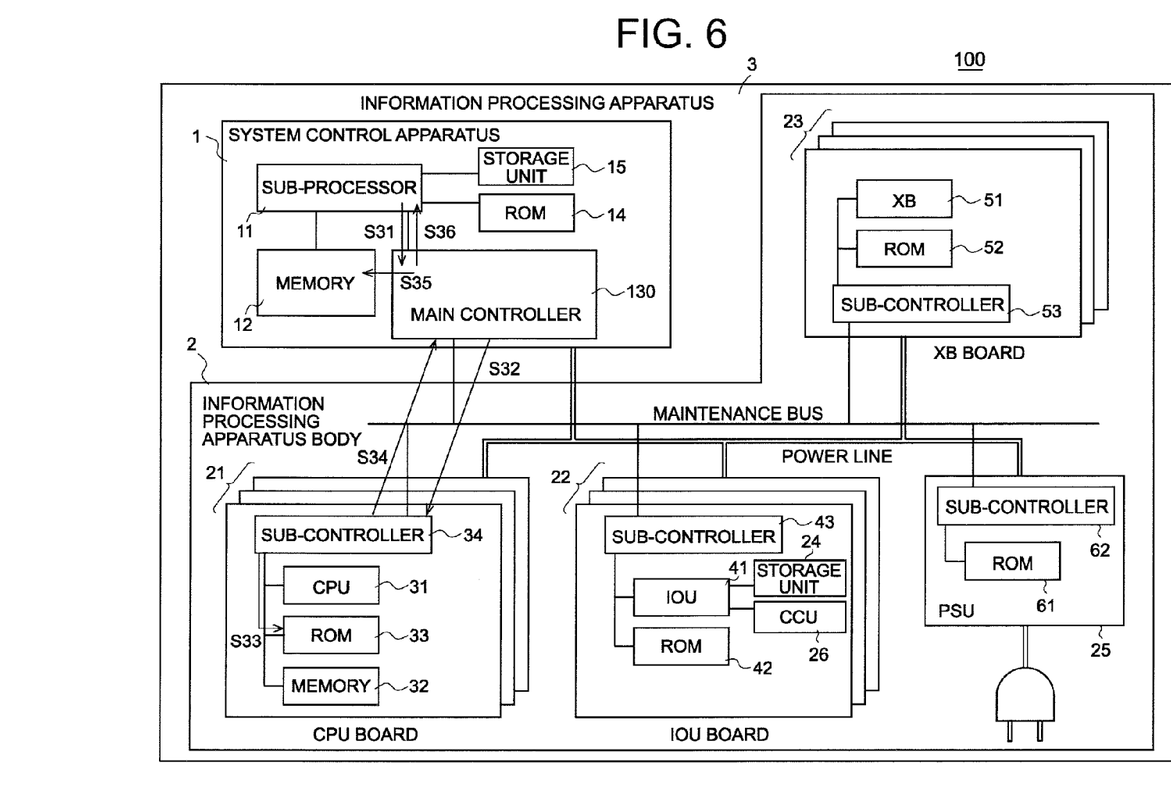
FIG. 6 is an explanatory diagram of initial diagnosis procedures in the comparative example.

FIG. 6 is an explanatory diagram of a method by which the system control apparatus 1 of the information processing apparatus 100 in the comparative example executes the initial diagnosis of the hardware implemented in the information processing apparatus body 2.

The processor 11 detects hardware components implemented in the information processing apparatus body 2, and sequentially transfers the diagnosis procedures for each of the implemented components to the main controller 130 (S31). The diagnosis procedures herein connote the information representing, e.g., the following items.

Unit Type: Specifies a type of the access target unit such as the CPU board, the IOU board and the PSU.

Unit Number: Specifies information for identifying the unit.

Access Target Device: Specifies information acquisition target device such as the ROM and the CPU in the hardware provided in the access target unit.

Access Means: Specifies a means for accessing the access target device. The access means, for example, I2C, JTAG, specifies a bus used for the sub-controller to access the access target device and a protocol.

Access Address: Specifies an address for accessing the access target device. The access address is exemplified such as an I2C bus address.

Result Storage Address: Defines an address for storing the information acquired from the access target device.

Then, the main controller 130 specifies the unit on the basis of the unit number, and transfers the procedures to the sub-controller of the unit (S32). For example, the main controller 130 transfers the procedures to the sub-controller 34 of the CPU board 21.

The sub-controller 34, in accordance with the access means and the access address described in the procedures received in S32, accesses the access target device, i.e., the CPU 31 or the ROM 33, thus acquiring the information (S33).

The sub-controller 34 transfers the acquired result to the main controller 130 (S34). It is to be noted that the present example exemplifies the CPU board 21, however, with respect to the IOU board 22 and the PSU 25, similarly the sub-controller acquires the information of the access target device and transfers the information to the main controller 130.

The main controller 130 stores the acquired result in the memory 12 on the basis of the result storage address (S35).

After storing the acquired result, the main controller 130 reports an end of the process with respect to the device to the sub-processor 11 (S36).

Then, the processor 11 transfers the diagnosis procedures about the next device to the main controller 130, and diagnoses all pieces of hardware implemented in the information processing apparatus body 2 in sequential order by repeating steps S31-S36.

Figure 7:
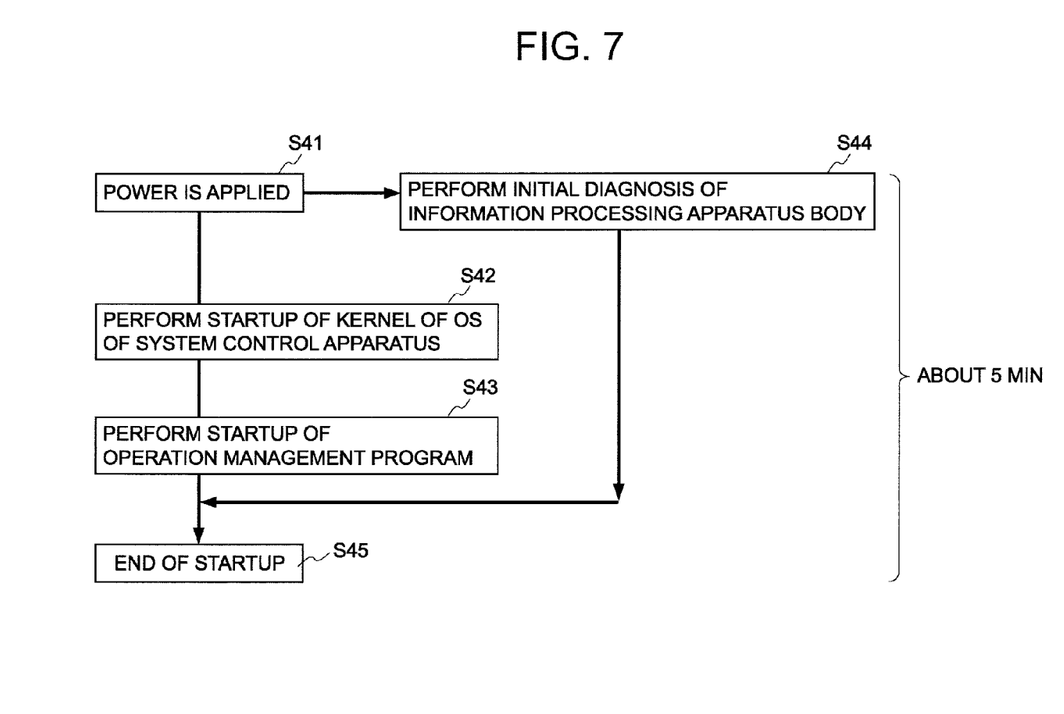
FIG. 7 is a diagram illustrating of a startup flow of the system control apparatus in the embodiment.

In the information processing apparatus 100 in the comparative example as illustrated in FIG. 5, the processor 11 performs the startup of the kernel (S22), performs the initial diagnosis (S23) and performs the startup of the operation management program (S24) in the sequential order. By contrast, in the system control apparatus 1 according to the embodiment, as illustrated in FIG. 7, when power is applied (S41), the sub-processor 11 performs the startup of the kernel (S42) and startup of the operation management service (S43), and in parallel with this operation the initial diagnosis circuit 16 performs the initial diagnosis of the information processing apparatus body 2 (S44). Then, after finishing the startup of the operation management program (S43) and the initial diagnosis (S44), the startup is completed (S45).

Figure 8:
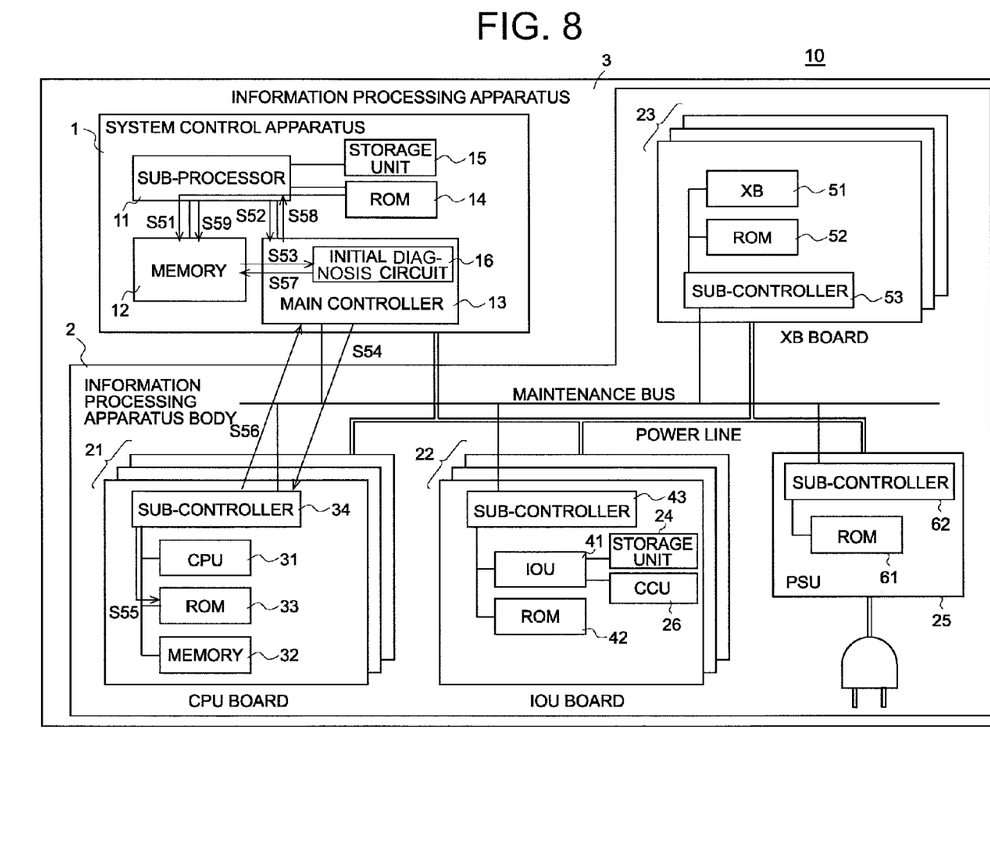
FIG. 8 is an explanatory diagram of the initial diagnosis procedures in the embodiment.

FIG. 8 is a diagram illustrating an initial diagnosis method of the information processing apparatus 10 in the embodiment.

Figure 9:
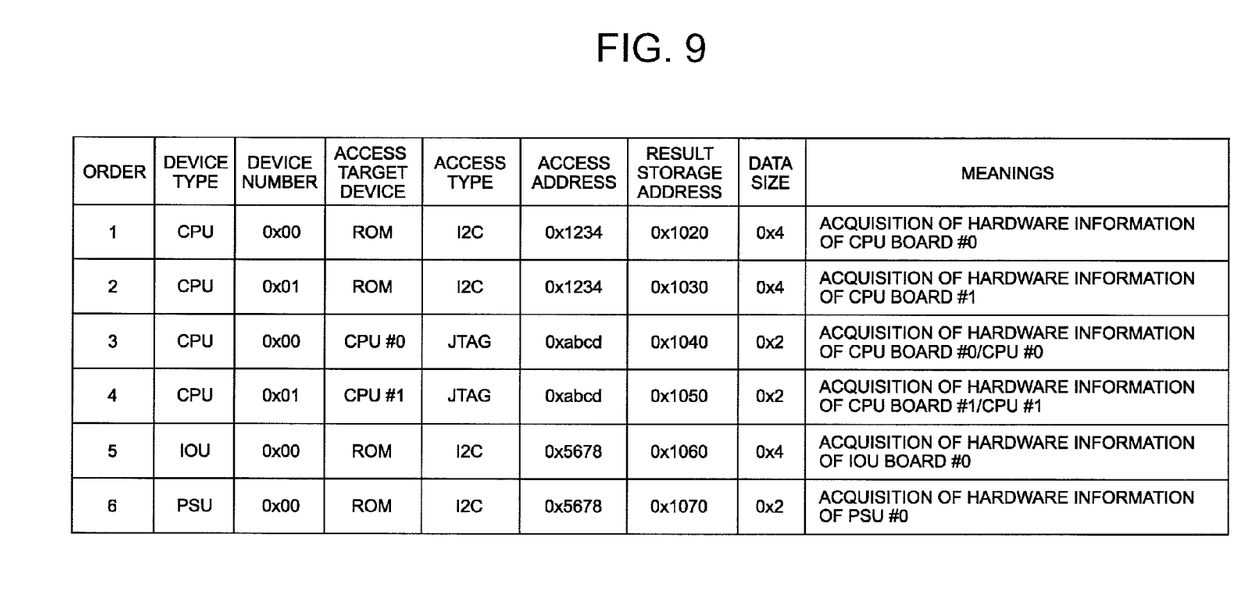
FIG. 9 is a diagram illustrating the diagnosis procedures.

When the startup of the system control apparatus 1 begins upon being supplied with the electric power, the processor 11 reads batchwise from the ROM 14 the diagnosis procedures about all pieces of hardware implemented in the information processing apparatus body 2, and stores the diagnosis procedures in the memory 12 (S51). FIG. 9 is an explanatory diagram of the diagnosis procedures stored in the memory 12. For example, the procedure in the sequential order 1 implies the acquisition of the hardware information of CPU board 0x00.

The processor 11, after storing the diagnosis procedures, instructs the main controller 13 to perform the initial diagnosis according to the diagnosis procedures (S52). The control circuit 17 within the main controller 13 receiving this instruction hands over the instruction to the initial diagnosis circuit 16.

In response to the instruction, in the initial diagnosis circuit 16, at first the reading unit 16B reads the diagnosis procedures on a one-by-one basis by a DMA (Direct Memory Access) method from the memory 12 and hands over the diagnosis procedures to the detecting unit 16A (S53).

The detecting unit 16A detects via the control circuit 17 whether the device associated with the device type and the device number in the diagnosis procedures is mounted or not, and, if mounted, hands over the diagnosis procedures to the sub-controller of the device (S54).

The sub-controller receiving the diagnosis procedures acquires the information from the access target device on the basis of the access type and the access address (S55). Then, the sub-controller transfers the acquired information to the main controller 13 (S56).

The detecting unit 16A of the main controller 13 acquiring the information transfers the acquired information to the writing unit 16C, and the writing unit 16C writes the information to the memory 12 in accordance with the result storage address (as the result storage address of the diagnosis procedures locates a storage position) (S57). Further, in step S54, if the device associated with the device type and the device number is not mounted, the detecting unit 16A transfers the information purporting that the device is not mounted to the writing unit 16C, and the writing unit 16C writes the information to the memory 12 according to the result storage address of the diagnosis procedures (S57).

Figure 10:
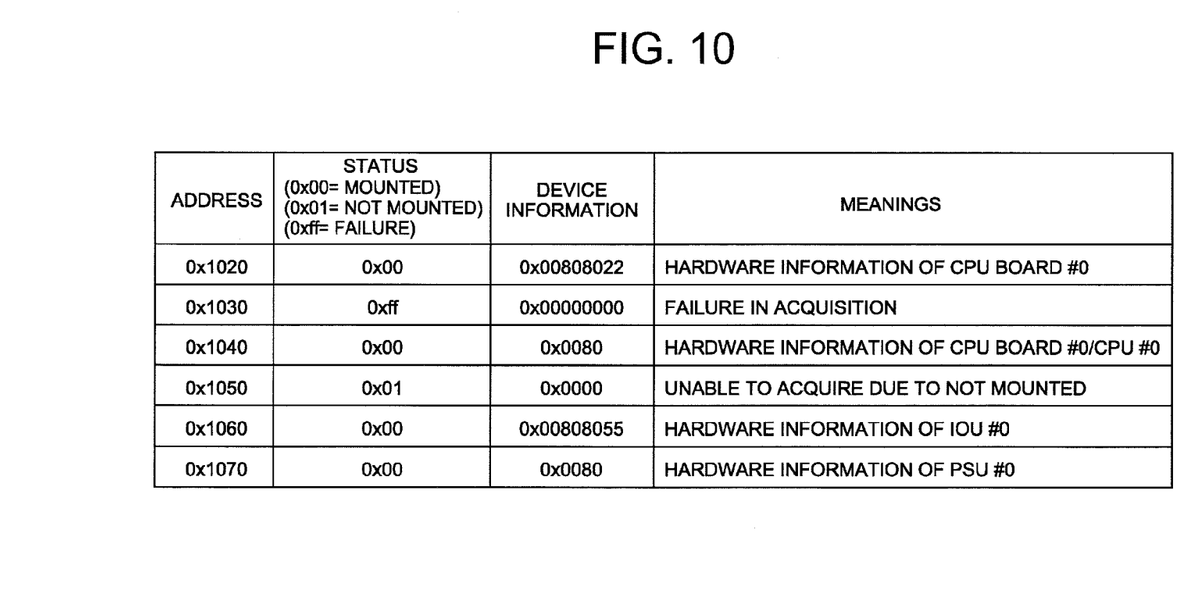
FIG. 10 is a diagram illustrating device information.

FIG. 10 is a diagram illustrating an example of the information written to the memory 12. As illustrated in FIG. 10, a status and a result are stored in each result storage address on the memory 12. A status "0x00" is recorded if the device is mounted, a status "0x01" is recorded if the device is not mounted, and a status "0xff" is recorded if acquiring of the information from the device is failed. The device information is the information acquired from the device.

If there are the next diagnosis procedures after being written to the memory 12, the initial diagnosis circuit 16 repeats the steps from reading the diagnosis procedures (S53) down to writing the device information (S57). Then, if there are not the next diagnosis procedures, i.e., if all the device information has been stored in the memory 12, the notifying unit 16D notifies the processor 11 of an end of the diagnosis process (S58).

The processor 11 receiving the notification of the end of the diagnosis process reads the device information from each result storage address of the memory 12 and utilizes the information (S59).

Specifically, in the case of the procedure 1 illustrated in FIG. 9, the detecting unit 16A detects whether the CPU board 21 specified by the number "0x00" is mounted or not, and, if mounted, the sub-controller 34 of the CPU board 21 specified by the number "0x00" takes over the diagnosis procedures (S54).

Figure 11:
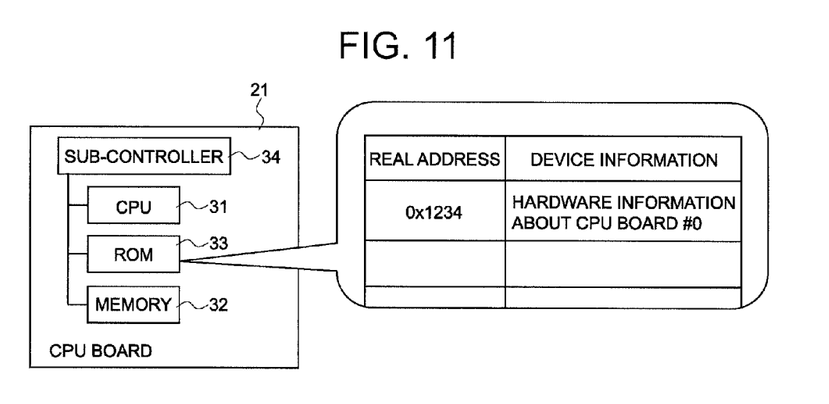
FIG. 11 is an explanatory diagram of the device information stored in a ROM of a CPU board.

The sub-controller 34, which has taken over the diagnosis procedures, accesses the ROM 33 via the I2C bus and reads, from an address "0x1234" of the ROM 33, 4-byte information, i.e., the device information (S55). As illustrated in FIG. 11, the device information of the CPU board 21 is stored in a 4-byte area from the access address "0x1234" of the ROM 33.

Figure 12:
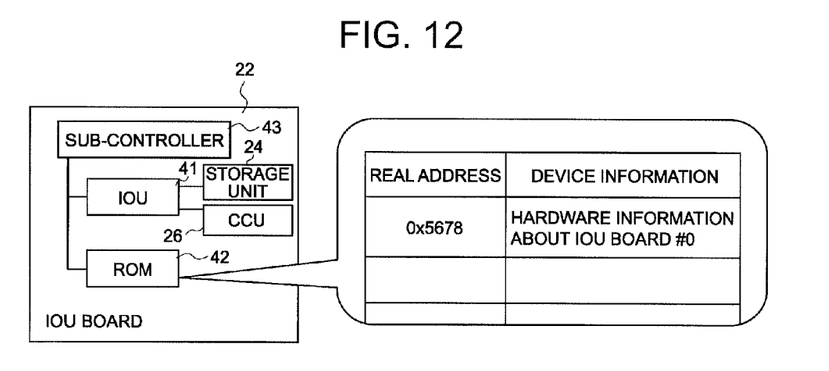
FIG. 12 is an explanatory diagram of the device information stored in a ROM of an IOU board.

Further, as illustrated in FIG. 12, the device information of the IOU board 22 is stored in an access address "0x5678" of the ROM 42.

Then, the sub-controller 34 transfers the acquired device information to the main controller 13 (S56), the writing unit 16C of the main controller 13 writes the device information to a result storage address "0x1020" on the memory 12 (S57).

Furthermore, in step S54, if the device associated with the device type and the device number is not mounted, the detecting unit 16A transfers the information indicating that the device is not mounted to the writing unit 16C, and the writing unit 16C writes the information to the memory 12 in accordance with the result storage address of the diagnosis procedures (S57).

As described above, the information processing apparatus 100 in the comparative example reads the initial program and makes the initial diagnosis in the sequential order with the result that 10 min is expended from the beginning the startup to the completion of the startup, while on the other hand the information processing apparatus 1 in the embodiment reads the initial program and makes the initial diagnosis in parallel with the result that the startup time from the beginning the startup to the completion of the startup can be reduced to 5 min.

Namely, as in the information processing apparatus 100 in the comparative example, the processor 11, when performing the initial diagnosis for diagnosing each device, is meanwhile occupied and is therefore disabled from executing other processes such as reading the initial program. This being the case, in the embodiment, the initial diagnosis circuit 16 performs the initial diagnosis, and meanwhile the processor 11 reads the initial program, thereby reducing the startup time.

Moreover, in the embodiment, the processor 11 writes batchwise the diagnosis procedures to the memory 12, while the initial diagnosis circuit 16 reads the diagnosis procedures from the memory 12 by the DMA method, whereby this scheme contributes to reduce the startup time by restraining the communications between the processor 11 and the main controller 13 as compared with the information processing apparatus 100 in the comparative example.

Further, in the information processing apparatus 100 in the comparative example, the main controller sends the completion notification to the processor 11 each time the device information is detected, and hence the completion notifications corresponding to the number of the devices are required. By contrast, in the embodiment, the completion notification is sent to the processor 11 only when completing the detection of all of the devices, and therefore the startup time can be reduced by restraining the communications between the processor 11 and the main controller 13.

Then, the reduction in startup time leads to reductions in development operation time and in maintenance operation time, thereby enabling the costs to be decreased.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus comprising:
an information processing apparatus body; and
a system control apparatus that diagnoses the information processing apparatus body,
the information processing apparatus body including:
a first processing unit that executes an arithmetic operation;
a first storage unit that stores configuration information of the first processing unit; and
a first control unit that controls a readout of the configuration information from the first storage unit,
the system control apparatus including:
a second storage unit that stores a program for controlling the system control apparatus and diagnosis procedures of the information processing apparatus;
a second processing unit that reads the program from the second storage unit and executes the program; and
a second control unit that detects the first processing unit by reading the configuration information of the first processing unit from the first storage unit via the first control unit on the basis of the diagnosis procedures stored in the second storage unit simultaneously with the execution of the program by the second processing unit.

2. The information processing apparatus according to claim 1, wherein the second control unit further writes the read configuration information of the first processing unit to the second storage unit.

3. An information processing apparatus comprising:
an information processing apparatus body having functional units; and
a system control apparatus that diagnoses the information processing apparatus body,
each of the functional units of the information processing apparatus body including:
a first processing unit that executes a specific operation;
a first storage unit that stores configuration information of the first processing unit; and
a first control unit that controls a readout of the configuration information from the first storage unit,
the system control apparatus including:
a second storage unit that stores a program for controlling the system control apparatus and diagnosis procedures of the information processing apparatus;
a second processing unit that reads the program from the second storage unit and executes the program; and
a second control unit that detects the first processing unit of each of the functional units by reading the configuration information from the first storage unit via the first control unit of each of the functional units on the basis of the diagnosis procedures stored in the second storage unit simultaneously with the execution of the program by the second processing unit.

4. The information processing apparatus according to claim 2, wherein the second control unit further notifies the second processing unit of this completion when completing the detection of the first processing units.

5. A information processing apparatus control method of controlling an information processing apparatus including: an information processing apparatus body including a first processing unit that executes an arithmetic operation, a first storage unit that stores configuration information of the first processing unit, and a first control unit that controls a readout of the configuration information from the first storage unit; and a system control apparatus that diagnoses the information processing apparatus body, the method comprising:
controlling the system control apparatus by a second processing unit of the system control apparatus;

diagnosing procedures of the information processing apparatus from a second storage unit of the system control apparatus by the second processing unit;

executing the program by the second processing unit; and getting the second control unit to detect the first processing unit by reading the configuration information of the first processing unit from the first storage unit via the first control unit on the basis of the diagnosis procedures stored in the second storage unit simultaneously with the executing of the program by the second processing unit.

6. The information processing apparatus control method according to claim 5, wherein further comprising writing the read configuration information of the first processing unit to the second storage unit.

* * * * *

UNITED STATES PATENT AND TRADEMARK OFFICE
CERTIFICATE OF CORRECTION

PATENT NO. : 8,417,932 B2
APPLICATION NO. : 13/048232
DATED : April 9, 2013
INVENTOR(S) : Musha et al.

Page 1 of 1

It is certified that error appears in the above-identified patent and that said Letters Patent is hereby corrected as shown below:

In the Claims

Column 10, Line 1, In Claim 4, delete "claim 2," and insert -- claim 3, -- therefor.

Signed and Sealed this
Twenty-fifth Day of February, 2014

Michelle K. Lee
*Deputy Director of the United States Patent and Trademark Office*